United States Patent [19]
Sacchetti et al.

[11] Patent Number: 6,127,304
[45] Date of Patent: Oct. 3, 2000

[54] MAGNESIUM DISCHLORIDE-ALCOHOL ADDUCTS AND CATALYST COMPONENTS OBTAINED THEREFROM

[75] Inventors: Mario Sacchetti; Gabriele Govoni; Anna Fait, all of Ferrara, Italy

[73] Assignee: Montell technology Company bv, Netherlands

[21] Appl. No.: 09/050,612

[22] Filed: Mar. 30, 1998

[30] Foreign Application Priority Data

Mar. 29, 1997 [NL] Netherlands .......................... 97200932

[51] Int. Cl.⁷ ................................ C08F 4/02; C08F 4/64; C08F 4/654

[52] U.S. Cl. .......................... 502/125; 502/103; 502/117; 502/123; 502/126; 502/127; 502/134; 502/158; 502/167; 502/169; 502/172; 526/125.3; 526/128

[58] Field of Search ...................................... 502/134, 103, 502/117, 169, 123, 125, 126, 127, 158, 167, 172; 526/125.3, 128

[56] References Cited

U.S. PATENT DOCUMENTS

| | | | |
|---|---|---|---|
| 3,953,414 | 4/1976 | Galli et al. | 526/348 |
| 4,399,054 | 8/1983 | Ferraris et al. | 502/125 |
| 4,421,674 | 12/1983 | Invernizzi et al. | 502/154 |
| 4,506,027 | 3/1985 | Invernizzi et al. | 502/9 |
| 5,234,879 | 8/1993 | Garoff et al. | 502/107 |
| 5,578,541 | 11/1996 | Sacchetti et al. | 502/126 |
| 5,710,229 | 1/1998 | Garroff et al. | 526/348 |
| 5,849,655 | 12/1998 | Shamshoum et al. | 502/125 |

FOREIGN PATENT DOCUMENTS

| | | |
|---|---|---|
| 0 400 333 | 4/1990 | European Pat. Off. . |
| 0 412 696 | 6/1990 | European Pat. Off. . |
| 0 395 083 | 10/1990 | European Pat. Off. . |
| 0 700 936 | 3/1996 | European Pat. Off. . |
| 0 713 886 | 5/1996 | European Pat. Off. . |
| 8-20607 | 1/1996 | Japan . |
| 8-20608 | 1/1996 | Japan . |
| 9-176225 | 7/1997 | Japan . |
| 93/11164 | 6/1993 | WIPO . |
| 93/11166 | 6/1993 | WIPO . |

OTHER PUBLICATIONS

Magalhaes et al., "Ziegler–Natta Catalyst for Ethylene and Propylene Polymerization Supported on Adducts of Magnesium Chloride with Methyl and Ethyl Alcohols", European Polymer Journal, vol. 27, No. 8, pp. 827–830, 1991.

Di Noto et al., "$MgCl_2$–Supported Ziegler–Natta Catalysts: a Structural Investigation by X–Ray Diffraction and Fourier–Transform IR Spectroscopy on the Chemical Actuation Process Through $MgCl_2$–Ethanol Adducts", Makromol. Chem. vol. 193, pp. 1653–1663, 1992.

Di Noto et al., "New Synthesis of a Highly Active $\alpha$–$MgCl_2$ for $MgCl_2/TiCl_4/AlEt_3$ Catalytic Systems", Macromol. Chem. Phys., vol. 197, pp. 3827–3835, 1996.

Bart et al., J. of Material Science, vol 30, pp. 2809–2820, 1995.

D. Geldart, Gas Fluidization Technology, J. Wiley & Sons, Ltd., p. 155, 1986.

Primary Examiner—Lorna M. Douyon
Attorney, Agent, or Firm—Bryan Cave LLP; Maurice B. Stiefel

[57] ABSTRACT

The present invention relates to $MgCl_2 \cdot mROH \cdot nH_2O$ adducts, where R is a $C_1$–$C_{10}$ alkyl, $2 \leq m \leq 4.2$, $0 \leq n \leq 0.7$, characterized by an X-ray diffraction spectrum in which, in the range of $2\theta$ diffraction angles between 5° and 15°, the three main diffraction lines are present at diffraction angles $2\theta$ of 8.8±0.2°, 9.4±0.2° and 9.8±0.2°, the most intense diffraction lines being the one at $2\theta$=8.8±0.2°, the intensity of the other two diffraction lines being at least 0.2 times the intensity of the most intense diffraction line. Catalyst components obtained from the adducts of the present invention are capable to give catalysts for the polymerization of olefins characterized by enhanced activity and stereospecificity with respect to the catalysts prepared from the adducts of the prior art.

23 Claims, No Drawings

MAGNESIUM DISCHLORIDE-ALCOHOL ADDUCTS AND CATALYST COMPONENTS OBTAINED THEREFROM

The present invention relates to magnesium dichloride/alcohol adducts which are characterized by particular chemical and physical properties. The adducts of the present invention are particularly useful as precursors of catalyst components for the polymerization of olefins. $MgCl_2$.alcohol adducts and their use in the preparation of catalyst components for the polymerization of olefins are well known in the art. J. C. J. Bart and W. Roovers [Journal of Material Science, 30 (1995), 2809–2820] describe the preparation of a number of $MgCl_2$.nEtOH adducts, with n ranging from 1.4 to 6, and their characterization by means of X-ray powder diffraction. A range of allegedly new adducts, with n=6, 4.5, 4, 3.33, 2.5, 1.67, 1.50 and 1.25, is characterized in terms of X-ray diffraction pattern. According to the authors, the $MgCl_2$.alcohol adducts can be converted to active polymerization catalyst supports through the elimination of the alcohol molecules from the adducts by thermal desolvation. In table III of the article, the characteristic diffraction lines of the above indicated new adducts are reported with reference to the interplanar distances. For convenience, the same diffraction lines are reported below with reference to the $2\theta$ diffraction angles, limitatedly to the range of $2\theta$ diffraction angles between 5° and 15° (the relative intensity $I/I_o$ with respect to the most intense diffraction line is reported in brackets). For n=1.25: $2\theta$=7.6° (100), 12.28° (25), 14.9° (8); for n=1.5: $2\theta$=8.44 (100), 11.95 (48), 14.2 (46); for n=1.67: $2\theta$=6.1° (9), 6.68° (100), 8.95° (50), 9.88° (33), 11.8° (8), 12.28° (33), 14.5° (13), 14.75° (4); for n=2.5: $2\theta$=6.3 (27), 9.4° (100), 9.93° (70), 11.7° (11), 12.35° (6), 14.9° (6); for n=3.33: $2\theta$=9.14° (15), 9.44° (100), 11.88° (15), 12.9° (27); for n=4: $2\theta$=8.7° (49), 10.1° (73), 10.49° (100), 11.8° (58); for n=4.5: $2\theta$=9.65° (100), 11.4° (10), 12.5° (24), 12.94° (32), 14.25° (20), 14.95° (6); for n=6: $2\theta$=8.94° (100), 13.13° (3). A $MgCl_2$.2EtOH.0.5$H_2O$ adduct is also reported, the diffraction lines of which in the relevant range are the following: $2\theta$=7.9° (35); 8.5° (>100); 9.7° (26); 11.32° (100); 12.59° (11); 13.46° (12).

Catalyst components for the polymerization of olefins, obtained by reacting $MgCl_2$.nEtOH adducts with halogenated transition metal compounds, are described in U.S. Pat. No. 4,399,054. The adducts are prepared by emulsifying the molten adduct in an immiscible dispersing medium and quenching the emulsion in a cooling fluid to collect the adduct in the form of spherical particles. No X-ray characteristics of the adducts are reported.

U.S. Pat. No. 4,421,674 describes a method for preparing a catalyst component for the polymerization of olefins which involves the preparation of $MgCl_2$.EtOH adducts by means of the following steps: (a) preparation of a $MgCl_2$ solution in ethanol; (b) spray-drying said solution to collect particles of the adduct in spherical form, said adduct having from 1.5 to 20% by weight of residual alcoholic hydroxyl content and being characterized by an X-ray spectrum in which the maximum peak at 2.56 Å (i.e. $2\theta$=35°) characteristics of the crystalline anhydrous $MgCl_2$ is practically absent and a new maximum peak at about 10.8 Å (i.e. $2\theta$=8.15°) is present; lesser peaks at about 9.16 Å (i.e. $2\theta$=9.65°) and 6.73 Å (i.e. $2\theta$=13.15°) are also reported.

EP-A-700936 describes a process for producing a solid catalyst component for the polymerization of olefins which comprises the preparation of $MgCl_2$.EtOH adducts by means of the following steps: (A) preparation of a mixture having formula $MgCl_2$.mROH, wherein R is an alkyl group with 1 to 10 carbon atoms and m=3.0 to 6.0; (B) spray-cooling said mixture to obtain a solid adduct having the same composition as of the starting mixture; (C) partly removing the alcohol from the above-obtained solid adduct to obtain an adduct containing from 0.4 to 2.8 mol of alcohol per mol of $MgCl_2$. The adduct obtained in (C) is characterized by an X-ray diffraction spectrum in which a novel peak does not occur at a diffraction angles $2\theta$=7 to 8° as compared with the diffraction spectrum of the adduct obtained in (B), or even if it occurs, the intensity of the novel peak is 2.0 times or less the intensity of the highest peak present at the diffraction angles $2\theta$=8.5 to 9° of the diffraction spectrum of the adduct obtained in (C). FIG. 2 of the said European Patent Application shows a typical X-ray diffraction spectrum of the adducts prepared in (B). The highest peak occurs at $2\theta$=8.8°; two less intense peaks occur at $2\theta$=9.5 to 10° and $2\theta$=13°, respectively. FIG. 3 shows a typical X-ray diffraction spectrum of the adducts prepared in (C). The highest peak occurs at $2\theta$=8.8°; other peaks occur at $2\theta$=6.0 to 6.5°, $2\theta$=9.5 to 10° and $2\theta$=11 to 11.50°. FIG. 4 shows a typical X-ray diffraction spectrum of comparative adducts prepared in (C). The highest peak occurs at $2\theta$=7.6°; other peaks occur at $2\theta$=8.8°, $2\theta$=9.5 to 10°, $2\theta$=11 to 11.5° and $2\theta$=12 to 12.5°.

A new $MgCl_2$.alcohol adduct has now been found which is characterized by a particular X-ray diffraction spectrum, not shown by the adducts of the prior art, and/or by a particular crystallinity as shown by the Differential Scanning Calorimetry (DSC) profile of the adduct. In addition, particular $MgCl_2$.alcohol adducts of the present invention can be characterized by their viscosity values in the molten state which, for a given alcohol content, are higher than the viscosity values of the corresponding adducts of the prior art. In addition to the alcohol, minor amounts of water can also be present in the adducts according to the invention.

The adducts of the present invention can be used to prepare catalyst components for the polymerization of olefins by reaction with transition metal compounds. Catalyst components obtained from the adducts of the present invention are capable to give catalysts for the polymerization of olefins characterized by enhanced activity and stereospecificity with respect to the catalysts prepared from the adducts of the prior art. Also, the morphological properties of the obtained polymers are improved, particularly when adducts in spherical forms are used.

The present invention therefore relates to $MgCl_2$.mROH.n$H_2O$ adducts, where R is a $C_1$–$C_{10}$ alkyl, $2 \leq m \leq 4.2$, $0 \leq n \leq 0.7$, characterized by an X-ray diffraction spectrum in which, in the range of $2\theta$ diffraction angles between 5° and 15°, the three main diffraction lines are present at diffraction angles $2\theta$ of 8.8±0.2°, 9.4±0.2° and 9.8±0.2°, the most intense diffraction lines being the one at $2\theta$=8.8±0.2°, the intensity of the other two diffraction lines being at least 0.2 times the intensity of the most intense diffraction line.

The above described diffraction pattern is unique and it has never been described in the prior art. In fact, none of the spectra reported in Bart et al. corresponds to the spectrum which characterizes the adducts of the present invention; the same applies to the adducts disclosed in EP-A-700936. As for the adducts described in U.S. Pat. No. 4,399,054, applicants repeated the preparation of the adducts according to the procedure described therein. The X-ray diffraction spectrum of the obtained adduct shows, in the range of $2\theta$ diffraction angles between 5 and 15°, the following main peaks (the relative intensity $I/I_o$ with respect to the most intense diffraction line is in brackets): $2\theta$=8.84° (79); $2\theta$=9.2 (100); $2\theta$=9.43 (68); $2\theta$=9.82 (19). Contrary to the adducts of the present invention, which are characterized, inter alia, by a most intense diffraction line occurring at 2θ=8.8 ±0.2°, the adducts of U.S. Pat. No. 4,399,054 are characterized by a most intense diffraction line at 2θ=9.2°. Preferably R is a $C_1$–$C_4$ alkyl, more preferably ethyl, m is between 2.2 and 3.8, more preferably between 2.5 and 3.5, n is between 0.01 and 0.6, more preferably between 0.001 and 0.4. The X-ray diffraction spectra are determined with reference to the main diffraction lines of silicon, used as an internal standard, using the apparatus and the methodology described hereinafter.

The preferred adducts of the present invention are characterized by an X-ray diffraction spectrum in which the intensity of the diffraction lines at 2θ=9.4°±0.2° and 9.8°±0.2° is at least 0.4 times, preferably at least 0.5 times the intensity of the most intense diffraction line at 2θ=8.8°±0.2°.

As an alternative, or in addition to the X-ray spectrum, the adducts of the present invention are characterized by a Differential Scanning Calorimetry (DSC) profile in which no peaks are present at temperatures below 90° C. or, even if peaks are present below said temperature, the fusion enthalpy associated with said peaks is less than 30% of the total fusion enthalpy.

The DSC analysis is carried out using the apparatus and the methodology described hereinafter.

When R is ethyl, m is between 2.5 and 3.5 and n is between 0 and 0.4, the fusion enthalpy associated with peaks possibly present at temperatures below 90° C. is less than 10% of the total fusion enthalpy. In said case the adducts are furthermore characterized by the fact that the maximum peak occurs at temperatures between 95 and 115° C.

Particularly preferred are adducts of the formula (I)

$$MgCl_2.mEtOH.nH_2O \qquad (I)$$

where m is between 2.2 and 3.8 and n is between 0.01 and 0.6, having both the above described X-ray spectrum and the above described DSC features. Adducts of this type can be further characterized by their viscosity in the molten state. In fact, it has been unexpectedly found that adducts with the above described features are also characterized by values of viscosity which, for a given alcohol content, are higher than the values of viscosity of the corresponding adducts of the prior art. In particular, on a plot viscosity vs. EtOH molar content, the values of viscosity at 115° C. (expressed in poise) of the adducts (I) are above the straight line passing through the points having, respectively, a viscosity/EtOH molar content of 2.43/2.38 and 1.26/3.31; at 120° the values of viscosity of the adducts (I) are above the straight line defined by the points having viscosity/EtOH molar content values of 1.71/2.38 and 0.9/3.31; at 125° the values of viscosity of the adducts (I) are above the straight line passing through the points defined by the viscosity/EtOH molar content values of 1.2/2.38 and 0.63/3.31.

The adducts of the present invention can be prepared with new methods, not disclosed in the prior art, which are characterized by particular modalities of reaction between $MgCl_2$, alcohol, and optionally water.

According to one of these methods $MgCl_2.pROH.qH_2O$ adducts, where R is a $C_1$–$C_{10}$ alkyl, $1 \leq p \leq 6$, $0 \leq 9 \leq 1$, are prepared by dispersing the particles of magnesium dichloride in an inert liquid immiscible with and chemically inert to the molten adduct, heating the system at temperature equal to or higher than the melting temperature of $MgCl_2$.alcohol adduct and then adding the desired amount of alcohol in vapour phase. The temperature is kept at values such that the adduct is completely melted.

The molten adduct is then emulsified in a liquid medium which is immiscible with and chemically inert to it and then quenched by contacting the adduct with an inert cooling liquid, thereby obtaining the solidification of the adduct.

The liquid in which the $MgCl_2$ is dispersed can be any liquid immiscible with and chemically inert to the molten adduct. For example, aliphatic, aromatic or cycloaliphatic hydrocarbons can be used as well as silicone oils. Aliphatic hydrocarbons such as vaseline oil are particularly preferred. After the $MgCl_2$ particles are dispersed in the inert liquid, the mixture is heated at temperatures preferably higher than 125° C. and more preferably at temperatures higher than 150° C. Conveniently, the vaporized alcohol is added at a temperature equal to or lower than the temperature of the mixture. Particularly preferred products obtainable with the above specified method are the adducts of formula $MgCl_2.mROH.nH_2O$, where R is a $C_1$–$C_{10}$ alkyl, $2 \leq m \leq 4.2$, $0 \leq n \leq 0.7$, and characterized by the specified X-ray diffraction spectrum.

According to another method, the adducts of the invention are prepared by contacting $MgCl_2$ and alcohol in the absence of the inert liquid dispersant, heating the system at the melting temperature of $MgCl_2$-alcohol adduct or above, and maintaining said conditions so as to obtain a completely melted adduct. Said molten adduct is then emulsified in a liquid medium which is immiscible with and chemically inert to it and finally quenched by contacting the adduct with an inert cooling liquid thereby obtaining the solidification of the adduct. In particular, the adduct is preferably kept at a temperature equal to or higher than its melting temperature, under stirring conditions, for a time period equal to or greater than 10 hours, preferably from 10 to 150 hours, more preferably from 20 to 100 hours. Alternatively, in order to obtain the solidification of the adduct, a spray-cooling process of the molten adduct can be carried out.

The catalyst components obtained from the adducts obtained with the above described processes show still more improved properties over the catalyst components prepared by the adducts which have been obtained with the same preparation method but without having been maintained for the requested period of time under the described conditions.

A further method for preparing $MgCl_2.pROH.qH_2O$ adducts, where R is a $C_1$–$C_{10}$ alkyl, $2 \leq p \leq 6$, $0 \leq 9 \leq 1$, comprises reacting the $MgCl_2$ solid particles and vaporized alcohol in a loop reactor comprising a densified zone in which the particles flow in a densified form under the action of gravity and a fast fluidization zone where the particles flow under fast fluidization conditions. As it is known, the state of fast fluidization is obtained when the velocity of the fluidizing gas is higher than the transport velocity, and it is characterized in that the pressure gradient along the direction of transport is a monotonic function of the quantity of injected solid, for equal flow rate and density of the fluidizing gas. The terms transport velocity and fast fluidization state are well known in the art; for a definition thereof, see, for example, "D. Geldart, Gas Fluidization Technology, page 155 et seqq., J. Wiley & Sons Ltd., 1986". In the second polymerization zone, where the particles flows in a densified form under the action of gravity, high values of density of the solid are reached (density of the solid=kg of solid particles per $m^3$ of reactor occupied), which approach the bulk density of the adduct; a positive gain in pressure can thus be obtained along the direction of flow, so that it becomes possible to reintroduce the solid particles into the fast fluidization zone without the help of special mechanical means. In this way, a "loop" circulation is set up, which is defined by the balance of pressures between the two zones of the reactor.

In particular, the above method is suitable to prepare MgCl$_2$.mROH.nH$_2$O adducts, where R is a C$_1$–C$_{10}$ alkyl, $2 \leq m \leq 4.2$, and $0 \leq n \leq 0.7$, characterized by the specified X-ray diffraction spectrum, carrying out the reaction between MgCl$_2$ particles and vaporized alcohol in the loop reactor, under conditions such that the vapour pressure of the formed adduct is kept at values lower than 30 mmHg when operating atmospheric pressure. Preferably, the vapour pressure of the adduct is kept at values lower than 25 mmHg and more preferably in the range 10–20 mmHg. Preferably, the reaction between magnesium dichloride and alcohol is carried out in a loop reactor in which the fast fluidization is obtained by a flow of an inert gas, such as nitrogen. The particles of the formed adduct are preferably discharged from the densified zone. As mentioned above, the reaction between magnesium dichloride and alcohol must be carried out under conditions which allow a substantial control of the reaction in order to avoid problems such as melting of the adduct or its substantial dealcoholation. Therefore, the temperature within the reactor, and particularly in the zone where the vaporized alcohol is fed, must be carefully controlled so as to maintain the vapour pressure of the adduct within the above limits. In particular, the control of the temperature is very important in view of the fact that the reaction is greatly exothermic. Therefore, it can be preferred working under conditions such that heat exchange is maximized. For the same reason, the feeding of the alcohol has to be controlled in order to obtain an efficient dispersion of the alcohol in the reactor, thus avoiding the formation of the so called hot spots. The feeding of the alcohol can be carried out for example with injection nozzles, preferably located in the fast fluidization zone of the loop reactor. According to an alternative method, the alcohol can be fed to the loop reactor in a zone after the densified zone and before the fast fluidization zone, where a centrifugal mixer (of the Loedige type) is installed in order to direct the solid particles towards the walls of the reactor and create a cavitated zone where the alcohol is preferably fed. Preferably, the reactor temperature in correspondence to the alcohol feeding zone should be maintained at values in the range 40–50° C. when operating at atmospheric pressure.

The particles of the adduct discharged from the loop reactor can be then subjected to a treatment capable of imparting them a spherical morphology. In particular, the treatment comprises subjecting the adducts to a temperature equal to or higher than the melting temperature of the adduct until the adduct is completely melted, said treatment being carried out in absence or presence of an inert liquid dispersant, then emulsifying the molten adduct in a liquid medium which is immiscible with and chemically inert to it and finally quenching the molten adduct with an inert cooling liquid thereby obtaining the solidification of the adduct in spherical form. Alternatively, in order to obtain the solidification of the adduct in spherical form, the molten adduct can be subjected to a spray-cooling process according to known techniques.

The treatment which comprises melting the adduct in the presence of an inert dispersant agent, such as vaseline oil, then emulsifying and finally quenching said molten adduct, is particularly preferred.

The liquid in which the molten adduct is emulsified is preferably a hydrocarbon liquid such as vaseline oil. The liquid used to quench the emulsion can be equal to or different from the liquid in which the molten adduct is emulsified. Preferably, it is an aliphatic hydrocarbon and more preferably a light aliphatic hydrocarbon such as pentane, hexane, heptane and the like.

The solid adducts having a spherical morphology are very suitable in the preparation of spherical catalyst components for the polymerization of olefins and in particular for the gas-phase polymerization process.

The catalyst components to be used in the polymerization of olefins comprise a transition metal compound of one of the groups IV to VI of the Periodic Table of Elements, supported on the adducts of the invention.

A method suitable for the preparation of said catalyst components, comprises the reaction between the adducts of the invention and the transition metal compound. Among transition metal compounds particularly preferred are titanium compounds of formula Ti(OR)$_n$X$_{y-n}$ in which n is comprised between 0 and y; y is the valency of titanium; X is halogen and R is an alkyl radical having 1–8 carbon atoms or a COR group. Among them, particularly preferred are titanium compounds having at least one Ti-halogen bond such as titanium tetrahalides or halogenalcoholates. Preferred specific titanium compounds are TiCl$_3$, TiCl$_4$, Ti(OBu)$_4$, Ti(OBu)Cl$_3$, Ti(OBu)$_2$Cl$_2$, Ti(OBu)$_3$Cl.

Preferably the reaction is carried out by suspending the adduct in cold TiCl$_4$ (generally OEC); then the so obtained mixture is heated up to 80–130EC and kept at this temperature for 0.5–2 hours. After that the excess of TiCl$_4$ is removed and the solid component is recoverd The treatment with TiCl$_4$ can be carried out one or more times.

The reaction between transition metal compound and the adduct can also be carried out in the presence of an electron donor compound (internal donor) in particular when the preparation of a stereospecic catalyst for the polymerization of olefins is to be prepared. Said electron donor compound can be selected from esters, ethers, amines, silanes and ketones. In particular, the alkyl and aryl esters of mono or polycarboxylic acids such as for example esters of benzoic, phthalic and malonic acid, are preferred. Specific examples of such esters are n-butylphthalate, di-isobutylphthalate, di-n-octylphthalate, ethyl-benzoate and p-ethoxy ethylbenzoate. Moreover, can be advantageously used also the 1,3 diethers of the formula:

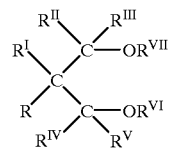

(I)

wherein R$^I$, R$^{II}$, R$^{III}$, R$^{IV}$, R$^V$ and R$^{VI}$ equal or different to each other, are hydrogen or hydrocarbon radicals having from 1 to 18 carbon atoms, and R$^{VII}$ and R$^{VIII}$, equal or different from each other, have the same meaning of R$^I$–R$^{VI}$ except that they cannot be hydrogen; one or more of the R$^I$–R$^{VIII}$ groups can be linked to form a cycle. The 1,3-diethers in which R$^{VII}$ and R$^{VIII}$ are selected from C$_1$–C$_4$ alkyl radicals are particularly preferred. The electron donor compound is generally present in molar ratio with respect to the magnesium comprised between 1:4 and 1:20.

Preferably, the particles of the solid catalyst components have substantially spherical morphology and an average diameter comprised between 5 and 150 µm. With the term substantial spherical morphology are meant those particles having a ratio between the greater and smaller axis equal to or lower than 1.5 and preferably lower than 1.3.

Before the reaction with the transition metal compound, the adducts of the present invention can also be subjected to a dealcoholation treatment aimed at lowering the alcohol content and increasing the porosity of the adduct itself. The dealcoholation can be carried out according to known methodologies such as those described in EP-A-395083. Depending on the extent of the dealcoholation treatment, partially dealcoholated adducts can be obtained having an alcohol content generally ranging from 0.1 to 2.6 moles of alcohol per mole of $MgCl_2$. After the dealcoholation treatment the adducts are reacted with the transition metal compound, according to the techniques described above, in order to obtain the solid catalyst components.

The solid catalyst components according to the present invention show a surface area (by B.E.T. method) generally between 10 and 500 $m^2/g$ and preferably between 20 and 350 $m^2/g$, and a total porosity (by B.E.T. method) higher than 0.15 $cm^3/g$ preferably between 0.2. and 0.6 $cm^3/g$.

Surprisingly, the catalyst components comprising the reaction product of a transition metal compound with a $MgCl_2$-alcohol adduct which is in turn obtained by partially dealcoholating the adducts of the invention, show improved properties, particularly in terms of activity, with respect to the catalyst components prepared from the dealcoholated adducts of the prior art.

The catalyst components of the invention form catalysts for the polymerization of alpha-olefins $CH_2$=CHR, wherein R is hydrogen or a hydrocarbon radical having 1–12 carbon atoms, by reaction with Al-alkyl compounds. The alkyl-Al compound is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$, optionally in mixture with said trialkyl aluminum compounds.

The Al/Ti ratio is higher than 1 and is generally comprised between 20 and 800.

In the case of the stereoregular polymerization of α-olefins such as for example propylene and 1-butene, an electron donor compound (external donor) which can be the same or different from the compound used as internal donor can be used in the preparation of the catalysts disclosed above. In case the internal donor is an ester of a polycarboxylic acid, in particular a phthalate, the external donor is preferably selected from the silane compounds containing at least a Si—OR link, having the formula $R_a^1 R_b^2 Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1–18 carbon atoms. Particularly preferred are the silicon compounds in which a is 1, b is 1, c is 2, at least one of $R^1$ and $R^2$ is selected from branched alkyl, cycloalkyl or aryl groups with 3–10 carbon atoms and $R^3$ is a $C_1$–$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also the 1,3 diethers having the previously described formula can be used as external donor. However, in the case 1,3-diethers are used as internal donors, the use of an external donor can be avoided, as the stereospecificity of the catalyst is already sufficiently high.

As previously indicated the components of the invention and catalysts obtained therefrom find applications in the processes for the (co)polymerization of olefins of formula $CH_2$=CHR in which R is hydrogen or a hydrocarbon radical having 1–12 carbon atoms.

The catalysts of the invention can be used in any of the olefin polymerization processes known in the art. They can be used for example in slurry polymerization using as diluent an inert hydrocarbon solvent, or bulk polymerization using the liquid monomer (for example propylene) as a reaction medium. Moreover, they can also be used in the polymerization process carried out in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (HDPE, having a density higher than 0.940 g/cc), comprising ethylene homopolymers and copolymers of ethylene with alpha-olefins having 3–12 carbon atoms; linear low density polyethylenes (LLDPE, having a density lower than 0.940 g/cc) and very low density and ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

The following examples are given to illustrate and not to limit the invention itself.

CHARACTERIZATION

The properties reported below have been determined according to the following methods:

X-ray diffraction spectra were carried out with a Philips PW 1710 instrument using the $CuK_\alpha$($\lambda$=1,5418 Å) with a 40 Kv tension generator, a 20 mA current generator and a receiving slit of 0.2 mm. The X-ray diffraction patterns were recorded in the range between 2θ=5° and 2θ=15° with a scanning rate of 0.05°2θ/10 sec. The instrument was calibrated using the ASTM 27-1402 standard for Silicon. The samples to be analyzed were closed in a polyethylene bag of 50 μm thickness operating in a dry-box.

The DSC measurement were carried out with a METTLER DSC 30 instrument at a scanning rate of 5° C./min in the range 5–125° C. Aluminum capsules having a volume of 40 μl filled with the samples in a dry-box were used in order to avoid hydration of the samples.

The viscosity measurement have been carried out according to ASTM D445-65 using a Cannon-Fenske type viscosimeter. During the measurement the samples are maintained in a dry nitrogen environment in order to avoid hydration.

EXAMPLES

General Procedure for the Preparation of the Catalyst Component

Into a 1l steel reactor provided with stirrer, 800 $cm^3$ of $TiCl_4$ at 0° C. were introduced; at room temperature and whilst stirring 16 g of the adduct were introduced together with an amount of diisobutylphthalate as internal donor so as to give a donor/Mg molar ratio of 10. The whole was heated to 100° C. over 90 minutes and these conditions were maintained over 120 minutes.

The stirring was stopped and after 30 minutes the liquid phase was separated from the sedimented solid maintaining the temperature at 100° C. A further treatment of the solid was carried out adding 750 cm$^3$ of TiCl$_4$ and heating the mixture at 120° C. over 10 min. and maintaining said conditions for 60 min under stirring conditions (500 rpm). The stirring was then discontinued and after 30 minutes the liquid phase was separated from the sedimented solid maintaining the temperature at 120° C. Thereafter, 3 washings with 500 cm$^3$ of anhydrous hexane at 60° C. and 3 washings with 500 cm$^3$ of anhydrous hexane at room temperature were carried out. The solid catalyst component obtained was then dried under vacuum in nitrogen environment at a temperature ranging from 40–45° C.

General Procedure for the Polymerization Test

A 4 litre steel autoclave equipped with a stirrer, pressure gauge, thermometer, catalyst feeding system, monomer feeding lines and thermostatting jacket, was used. The reactor was charged with 0.01 gr of solid catalyst component 0,76 g of TEAL, 0.076 g of dicyclopentyl dimetoxy silane, 3.2 1 of propylene, and 1.5 1 of hydrogen. The system was heated to 70° C. over 10 min. under stirring, and maintained under these conditions for 120 min. At the end of the polymerization, the polymer was recovered by removing any unreacted monomers and was dried under vacuum.

Example 1

Preparation of the Adduct 100 gr of MgCl$_2$ were dispersed in 1200 cm$^3$ of OB55 vaselin oil into a vessel reactor. The temperature was raised up to 160° C. and 135,2 g. of vaporized EtOH having the same temperature were slowly added to the mixture. At the end of the addition, the mixture was cooled up to 125° C. and maintained at this temperature obtaining a completely melted and clear adduct.

This mixture was kept at 125° under stirring conditions by means of a Ultra Turrax T-45 type stirrer operating at 2000 rpm. Thereupon the mixture was discharged into a vessel containing hexane which was kept under stirring and cooled so that the final temperature did not exceed 12° C. The solid particles of the MgCl$_2$.EtOH adduct recovered, containing 57% by weight of EtOH, were then washed with hexane and dried at 40° C. under vacuum.

The X-ray spectrum of the adduct showed in the range of 2θ diffraction angles between 5° and 15° three diffraction lines present at diffraction angles 2θ of 8.80° (100), 9.40° (63) and 9.75° (54); the number in brackets represents the intensity I/I$_o$ with respect to the most intense line.

The DSC profile showed a peak at 100.5° C. and a peak at 81.40° C. for a total fusion enthalpy of 107.9 J/g. The fusion enthalpy associated with the peak at 81.40° C. was 6.9 J/g corresponding to 6.3% of the total fusion enthalpy. The catalyst component, prepared according to the general procedure, was tested according to the general polymerization procedure described above and gave the results reported in Table 1.

Example 2

100 gr of MgCl$_2$ were introduced in a vessel reactor which contained 135,2 g of EtOH at room temperature and under stirring. Once the addition of MgCl$_2$ was completed the temperature was raised up to 125° C. and kept at this value for 10 hours.

The so obtained adduct was transferred in a vessel containing 1200 cm$^3$ of OB55 vaseline oil, and kept at 125° C. under stirring conditions by means of a Ultra Turrax T-45 type stirrer operating at 2000 rpm for a total time of 20 hours. Thereupon the mixture was discharged into a vessel containing hexane which was kept under stirring and cooled so that the final temperature did not exceed 12° C. The solid particles of the MgCl$_2$.EtOH adduct recovered, containing 57% by weight of EtOH, were then washed with hexane and dried at 40° C. under vacuum.

The X-ray spectrum of the adduct showed in the range of 2θ diffraction angles between 5° and 15° three diffraction lines present at diffraction angles 2θ of 8.83° (100), 9.42° (65) and 9.80° (74); the number in brackets represents the intensity I/I$_o$ with respect to the most intense line. The DSC profile showed a peak at 103.4° C., a peak at 97.2° C., a peak at 80.1° C. and a peak at 70.2° C. for a total fusion enthalpy of 101 J/g. The fusion enthalpy associated with the peaks at 80.1° C. and at 70.2° C. was 16.5 J/g corresponding to 16.3% of the total fusion enthalpy.

The catalyst component, prepared according to the general procedure, was tested according to the general polymerization procedure described above and gave the results reported in Table 1.

Example 3

100 gr of MgCl$_2$ were introduced in a vessel reactor which contained 135,2 g of EtOH at room temperature and under stirring. Once the addition of MgCl$_2$ was completed the temperature was raised up to 125° C. and the system maintained at this temperature and under stirring conditions for 70 hours.

The so obtained adduct was transferred in a vessel containing 1200 cm$^3$ of OB55 vaseline oil, and kept at 125° C. under stirring conditions by means of a Ultra Turrax T-45 type stirrer operating at 2000 rpm. Thereupon the mixture was discharged into a vessel containing hexane which was kept under stirring and cooled so that the final temperature did not exceed 12° C.

The solid particles of the MgCl$_2$.EtOH adduct recovered, containing 57.4% by weight of EtOH, were then washed with hexane and dried at 40° C. under vacuum.

The X-ray spectrum of the adduct showed in the range of 2θ diffraction angles between 5° and 15° three diffraction lines present at diffraction angles 2θ of 8.83° (100), 9.42° (64) and 9,82° (73); the number in brackets represents the intensity I/I$_o$ with respect to the most intense line.

The DSC profile showed a peak at 105.7° C., and a peak at 64.6° C. for a total fusion enthalpy of 90.3 J/g. The fusion enthalpy associated with the peak at 64.6° was of 0.7 J/g corresponding to 0.77% of the total fusion enthalpy.

The catalyst component, prepared according to the general procedure, was tested according to the general polymerization procedure described above and gave the results reported in Table 1.

Example 4

In a loop reactor comprising a fast fluidization zone and a densified zone when the particles flow under the action of gravity were charged 100 g of MgCl$_2$. Then, 135.2 g of EtOH vaporized in a oven at 180° C., were conveyed, by a dry nitrogen flow, to the cavitated zone of a Loedige type apparatus placed into the loop reactor after the densified zone and before the fast fluidization zone. The feeding of EtOH was controlled so as to maintain the temperature in the feeding zone in the range between 42 to 48° C. Once the feeding of the alcohol was completed the particles of the adduct were transferred in a vessel containing 1200 cm³ of OB55 vaseline oil, the temperature was raised up to 125° C. and the system maintained under said conditions until the adduct became completely melted and clear. This mixture was kept at 125° C. under stirring conditions by means of a Ultra Turrax T-45 type stirrer operating at 2000 rpm. Thereupon the mixture was discharged into a vessel containing hexane which was kept under stirring and cooled so that the final temperature did not exceed 12° C.

The solid particles of the $MgCl_2.EtOH$ adduct recovered, containing 56.5% by weight of EtOH were then washed with hexane and dried at 40° C. under vacuum.

The X-ray spectrum of the adduct showed in the range of 2θ diffraction angles between 5° and 15° three diffraction lines present at diffraction angles 2θ of 8.90° (100), 9.48° (75) and 9.84° (63); the number in brackets represents the intensity $I/I_o$ with respect to the most intense line.

The DSC profile showed a peak at 108.2° C., and a peak at 69.1° C. for a total fusion enthalpy of 97.7 J/g. The fusion enthalpy associated with the peak at 69.1° C. was of 3.1 J/g corresponding to 3.1% of the total fusion enthalpy.

The catalyst component, prepared according to the general procedure, was tested according to the general polymerization procedure described above and gave the results reported in Table 1.

Comparison Example 5

100 gr of $MgCl_2$ were dispersed in 1200 cm³ of OB55 vaselin oil into a vessel reactor and 135,2 g of liquid EtOH were added to the mixture. At the end of the addition the temperature was raised up to 125° C. and kept at this temperature for 2 hours. The mixture was kept at 125° C. under stirring conditions by means of a Ultra Turrax T-45 type stirrer operating at 2000 rpm. Thereupon the mixture was discharged into a vessel containing hexane which was kept under stirring and cooled so that the final temperature did not exceed 12° C. The solid particles of the $MgCl_2$-EtOH adduct containing 57% by weight of EtOH were then washed with hexane and dried at 40° C. under vacuum.

The X-ray spectrum of the adduct showed in the range of 2θ diffraction angles between 5° and 15° four diffraction lines present at diffraction angles 2θ of 8.84° (79.3), 9.2° (100), 9.43° (68.2) and 9.82° (19.5); the number in brackets represents the intensity I/Io with respect to the most intense line. The DSC profile showed a peak at 99.8° C., a peak at 82.8° C., and a peak at 71.3° C. for a total fusion enthalpy of 107.2 J/g. The fusion enthalpy associated with the peak at 82.8° C. and the peak at 71.3° C. was of 57.1 J/g corresponding to 53.2% of the total fusion enthalpy. The catalyst component, prepared according to the general procedure, was tested according to the general polymerization procedure described above and gave the results reported in Table 1.

Example 6

An $MgCl_2$-EtOH adduct prepared according to the procedure of Example 2 was thermally dealcoholated until the content of EtOH reached 44% b.w. Then, the partially dealcoholated adduct was used to prepare, according to the general procedure, the catalyst component which was then used in a polymerization test carried out according to the procedure described above. The results are reported in Table 1.

Comparison Example 7

An $MgCl_2$-EtOH adduct prepared according to the procedure of Comparison Example 5 was thermally dealcoholated until the content of ETOH reached 44% b.w. Then, the partially dealcoholated adduct was used to prepare, according to the general procedure, the catalyst component which was then used in a polymerization test carried out according to the procedure described above. The results are reported in Table 1.

Example 8

83 gr of $MgCl_2$ were introduced in a vessel reactor which contained 170 g of EtOH at −19° C. and under stirring conditions. Once the addition of $MgCl_2$ was completed the temperature was raised up to 100° C. and kept at this value for 5 hours. The so obtained adduct was transferred in a vessel containing 1200 cm of OB55 vaseline oil, and kept at 125° C. under stirring conditions by means of a Ultra Turrax T-45 type stirrer operating at 2000 rpm for a total time of 10 hours. Thereupon the mixture was discharged into a vessel containing hexane which was kept under stirring and cooled so that the final temperature did not exceed 12° C. The solid particles of the $MgCl_2.EtOH$ adduct recovered, containing 64% by weight of EtOH, were then washed with hexane and dried at 40° C. under vacuum. The DSC profile showed a peak at 100.7° C., and a peak at 56.5° C. for a total fusion enthalpy of 103 J/g. The fusion enthalpy associated with the peak at 56.5° C. was 12.8 J/g corresponding to 12.4% of the total fusion enthalpy. The catalyst component, prepared according to the general procedure, was tested according to the general polymerization procedure described above and gave the results reported in Table 1.

TABLE 1

| Example | Activity | Poured bulk density | Morphological evaluation |
|---|---|---|---|
| 1 | 70 | 0.43 | spherical polymer |
| 2 | 70 | 0.43 | spherical polymer |
| 3 | 80 | 0.45 | spherical polymer |
| 4 | 70 | 0.43 | spherical polymer |
| comp. 5 | 50 | 0.40 | spherical polymer with breakages |
| 6 | 40 | 0.43 | spherical polymer |
| comp. 7 | 35 | 0.4 | spherical polymer |
| 8 | 60 | 0.4. | spherical polymer |

What is claimed is:

1. A $MgCl_2.mROH.nH_2O$ adduct, where R is a $C_1$–$C_{10}$ alkyl, $2 \leq m \leq 4.2$, and $0 \leq n \leq 0.7$, characterized by a X-ray diffraction spectrum in which in the range of 2θ diffraction angles between 5° and 15° three diffraction lines are present at diffraction angles 2θ of 8.8±0.2°, 9.4±0.2° and 9.8±0.2°, the most intense diffraction line being the one at 2θ=8.8±0.2°, the intensity of the other two diffraction lines being at least 0.2 times the intensity of the most intense diffraction lines.

2. An adduct according to claim 1, wherein $2.2 \leq m \leq 3.8$, and $0.01 \leq n \leq 0.6$ and R is a $C_1$–$C_4$ alkyl.

3. An adduct according to claim 2, wherein R is ethyl.

4. An adduct according to claim 3, wherein the intensity of the diffraction lines at 2θ=9.4°±0.2° and 9.8°±0.2° is at least 0.4 times the intensity of the most intense diffraction line.

5. An adduct according to claim 4, wherein the intensity of the diffraction lines at 2θ=9.4°±0.2° and 9.8°±0.2° is at least 0.5 times the intensity of the most intense diffraction line.

6. An adduct according to claim 3, characterized by a Differential Scanning Calorimetry (DSC) profile in which no peaks are present at temperatures below 90° C. or, if peaks are present below said temperature, the fusion enthalpy associated with said peaks is less than 30% of the total fusion enthalpy.

7. An adduct according to claim 6 which is further characterized by a viscosity value at 125° C. which lies, on a plot viscosity vs. EtOH molar content, above the straight line passing through the points having, respectively, a viscosity expressed in poise and a EtOH molar content of 1.2/2.38 and 0.63/3.31.

8. An adduct according to claim 6, wherein the three diffraction lines at 2θ=8.8°±0.2°, 9.4°±0.2° and 9.8°±0.2° are the three main diffraction lines in the range of 2θ diffraction angles between 5° and 15°.

9. An adduct according to claim 6, wherein if peaks in the Differential Scanning Calorimetry (DSC) profile are present at temperatures below 90° C., the fusion enthalpy associated with said peaks is less than 10% of the total fusion enthalpy, and wherein the maximum peak occurs at temperatures between 95 and 115° C.

10. An adduct according to claim 1, in the form of spherical particles.

11. A catalyst component for the polymerization of olefins comprising the product of the reaction between a transition metal compound and an adduct according to claim 1.

12. A catalyst component for the polymerization of olefins comprising the product of the reaction between a transition metal compound and a $MgCl_2$-alcohol adduct, said adduct being obtainable by partially dealcoholating an adduct according to claim 1.

13. A catalyst component for the polymerization of olefins according to claim 12 in which the partially dealcoholated adduct contains from 0.1 to 2.6 moles of alcohol per mole of $MgCl_2$.

14. A catalyst component for the polymerization of olefins according to claim 11 in which the transition metal compound is a titanium compound of formula $Ti(OR)_n X_{y-n}$ in which n is between 0 and y; y is the valency of titanium; X is halogen and R is an alkyl radical having 1–8 carbon atoms or a COR group.

15. A catalyst component for the polymerization of olefins according to claim 14 in which the transition metal compound is a titanium compound having at least one Ti-halogen bond.

16. A catalyst component for the polymerization of olefins according to claim 15, wherein the titanium compound is titanium tetrahalides or halogenalcoholates.

17. A catalyst component for the polymerization of olefins according to claim 15 comprising an electron donor compound.

18. A catalyst component for the polymerization of olefins according to claim 17 in which the electron donor compound is selected from the group consisting of esters, ethers, amines, silanes and ketones.

19. A catalyst component for the polymerization of olefins according to claim 18 in which the electron donor compound is selected from the group consisting of alkyl and aryl esters of mono and polycarboxylic acids.

20. Catalyst for the polymerization of olefins comprising the product of the reaction between a catalyst component according to claim 11, and an aluminum alkyl compound.

21. Catalyst for the polymerization of olefins according to claim 20 in which the aluminum compound is a Al-trialkyl compound.

22. Catalyst for the polymerization of olefins according to claim 20 further comprising an external donor.

23. Catalyst for the polymerization of olefins according to claim 22 in which the external donor is selected from the group consisting of silane compounds containing at least a Si—OR link, having the formula $R_a^1 R_b^2 Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1–18 carbon atoms.

* * * * *